US012698086B2

(12) United States Patent
Powell et al.

(10) Patent No.: US 12,698,086 B2
(45) Date of Patent: Aug. 4, 2026

(54) AIRCRAFT WITH OVERWING ENGINE POSITION

(71) Applicant: The Boeing Company, Arlington, VA (US)

(72) Inventors: Donald Thomas Powell, Everett, WA (US); Sean Howe, Edmonds, WA (US); Kyle David Stevens, Mill Creek, WA (US); Druh Saul Palma, Mill Creek, WA (US)

(73) Assignee: THE BOEING COMPANY, Arlington, VA (US)

( * ) Notice: Subject to any disclaimer, the term of this patent is extended or adjusted under 35 U.S.C. 154(b) by 49 days.

(21) Appl. No.: 18/429,710

(22) Filed: Feb. 1, 2024

(65) Prior Publication Data

US 2025/0250017 A1     Aug. 7, 2025

(51) Int. Cl.
  B64D 27/40       (2024.01)
  B64C 3/32        (2006.01)
  B64C 30/00       (2006.01)

(52) U.S. Cl.
  CPC ............... B64D 27/40 (2024.01); B64C 3/32 (2013.01); B64C 30/00 (2013.01)

(58) Field of Classification Search
  CPC ............ B64D 27/40; B64C 3/32; B64C 30/00
  See application file for complete search history.

(56) References Cited

U.S. PATENT DOCUMENTS

| | | | | |
|---|---|---|---|---|
| 3,938,760 | A | * | 2/1976 | Hoppner ............... B64C 23/005 |
| | | | | 244/12.5 |
| 9,555,895 | B2 | | 1/2017 | Vander Lind et al. |
| 10,814,990 | B2 | | 10/2020 | Vassberg et al. |
| 2015/0144733 | A1 | * | 5/2015 | Vander Lind ......... B64D 27/40 |
| | | | | 244/54 |
| 2018/0162514 | A1 | * | 6/2018 | Bellet .................... B64D 29/06 |
| 2018/0334259 | A1 | * | 11/2018 | Aten ....................... B64D 27/18 |
| 2020/0002014 | A1 | * | 1/2020 | Vassberg ................ F02K 3/068 |
| 2023/0365247 | A1 | | 11/2023 | Stevens et al. |

OTHER PUBLICATIONS

EP Search Report mailed Apr. 23, 2025 in re EP Application No. 25154373.2.

* cited by examiner

*Primary Examiner* — Kimberly S Berona
*Assistant Examiner* — Steven J Shur
(74) *Attorney, Agent, or Firm* — COATS & BENNETT, PLLC

(57)                ABSTRACT

An aircraft that includes a fuselage, right and left wings coupled to the fuselage, struts that are connected to and that extend outward from an underside of the wings, and engines mounted to the struts. The struts are configured to locate the engines in an overwing position.

20 Claims, 7 Drawing Sheets

AIRCRAFT WITH OVERWING ENGINE POSITION

TECHNOLOGICAL FIELD

The present disclosure relates generally to the field of aircraft and, more specifically, to an aircraft design having a strut that secures an engine to an underside of a wing and positions the engine over the wing.

BACKGROUND

Many aircraft include a low wing design with the wings positioned below the fuselage. Engines are mounted and positioned on the underside of the wings to provide propulsion. One issue with low wing aircraft is the relatively small vertical clearance between the engines and the ground. One specific issue occurs with open rotor aircraft due to their relatively large vertical clearance requirements. This low ground clearance issue has been addressed in various ways however each has drawbacks.

One manner of addressing the low clearance is to raise the positioning of the engines. However, the extent to which the engines can be raised is limited by the ability to maintain a conventional strut architecture. This change can also necessitate larger overwing fairings which increase drag and significantly reduce aircraft performance. Another manner of addressing the low clearance is to increase the gear height. However, this causes significant impacts to the aircraft architecture, wing planform, and potential tail size.

Some aircraft are equipped with turbofan engines for propulsion. The turbofan engines are mounted to a wing by a strut and positioned under the wing. The underwing position results in exhaust generated by a fan in the turbofan engine being directed under the wing. The heated exhaust requires shielding to be positioned on the underside of the wing. Further, changing the design can also cause significant impacts to different aspects of the aircraft architecture.

SUMMARY

One aspect is directed to an aircraft comprising a fuselage, right and left wings coupled to the fuselage, struts that are connected to and that extend outward from an underside of the wings, engines mounted to the struts, and wherein the struts locate the engines in an overwing position.

In another aspect, the engines are mounted to tops of the struts.

In another aspect, a centerline of each of the engines is positioned vertically above the wings.

In another aspect, a top side of the wings are clean by being free of structures that cause a decrease in performance.

In another aspect, the engines are open rotor engines.

In another aspect, the struts comprise spars that are spaced apart along a length of the struts, bulkheads positioned along the length and aligned transverse to the spars, and links that are connected to the wings.

In another aspect, each of the struts comprise at least two spars.

In another aspect, the aircraft comprises a low wing design with the wings positioned below the fuselage.

In another aspect, the aircraft is transonic.

One aspect is directed to an aircraft comprising: a fuselage; a right wing and a left wing each coupled to the fuselage and each having a top side and an underside; a first strut mounted to the right wing away from the top side; a second strut mounted to the left wing away from the top side; a first engine mounted to the first strut and positioned over the right wing; and a second engine mounted to the second strut and positioned over the left wing.

In another aspect, the aircraft is a low wing aircraft.

In another aspect, the aircraft is transonic.

In another aspect, the first engine vertically overlaps with the right wing and the second engine vertically overlaps with the left wing.

In another aspect, each of the first strut and the second strut include a common configuration of structural members.

In another aspect, each of the first engine and the second engine are open rotor engines.

In another aspect, the first strut is positioned away from a top side of the right wing and the second strut is positioned away from a top side of the left wing.

In another aspect, each of the first strut and the second strut comprise kinks.

One aspect is directed to a method of mounting an engine to a wing of a low wing aircraft. The method comprises: connecting a first end of a strut to an underside of the wing with the strut positioned away from a top side of the wing; and mounting the engine to a second end of the strut with a centerline of the engine positioned vertically above the wing.

In another aspect, the method further comprises mounting the engine to a top of the strut.

In another aspect, the method further comprises positioning a rotor of the engine forward of a leading edge of the wing.

The features, functions and advantages that have been discussed can be achieved independently in various aspects or may be combined in yet other aspects, further details of which can be seen with reference to the following description and the drawings.

DETAILED DESCRIPTION

Figure 1:
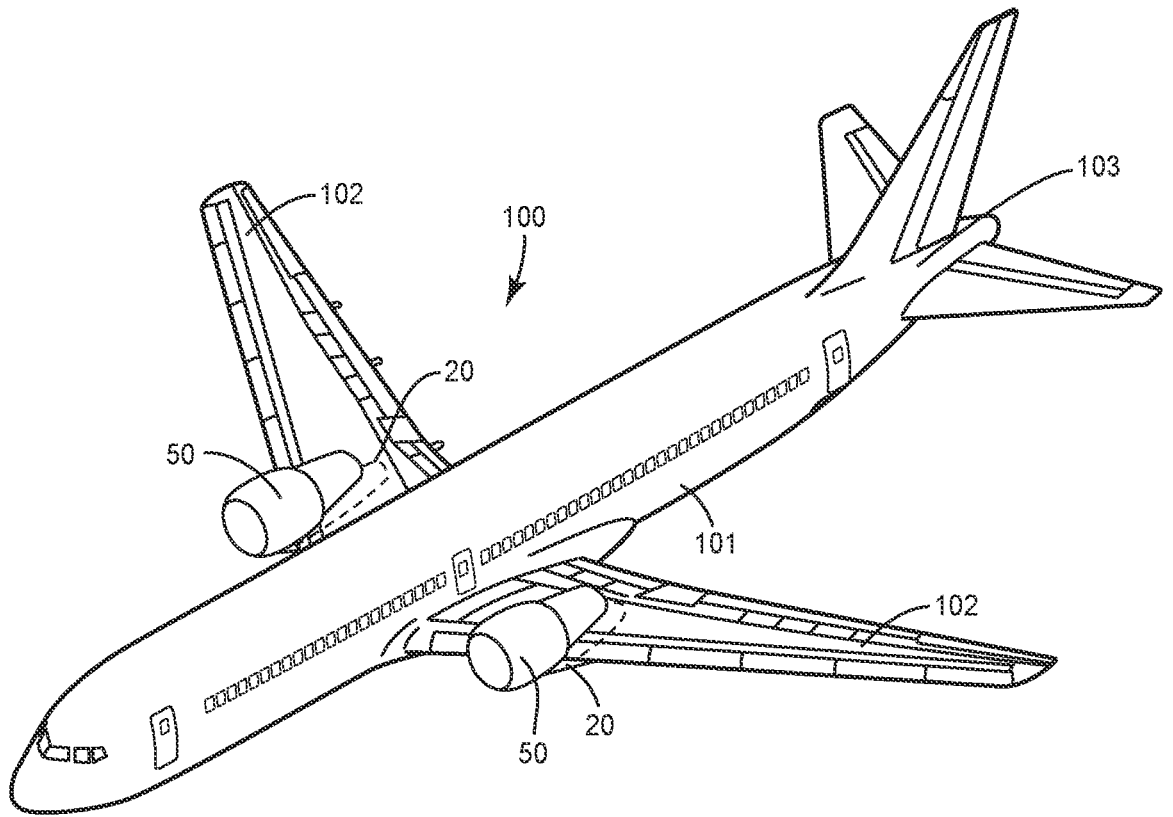
FIG. 1 is an isometric diagram of an aircraft with an overwing architecture with engines positioned above the wings.

FIG. 1 illustrates an aircraft 100 that generally includes a fuselage 101, right and left wings 102, and a tail 103. The aircraft 100 has a low wing design with the wings 102 positioned vertically below the fuselage 101. An engine 50 is mounted through a strut 20 to each of the wings 102. The struts 20 extend outward from an underside of the wings 102. The engines 50 are mounted to the struts 20. The struts 20 are configured to position the engines 50 over the wings (i.e., an overwing architecture).

Figure 2:
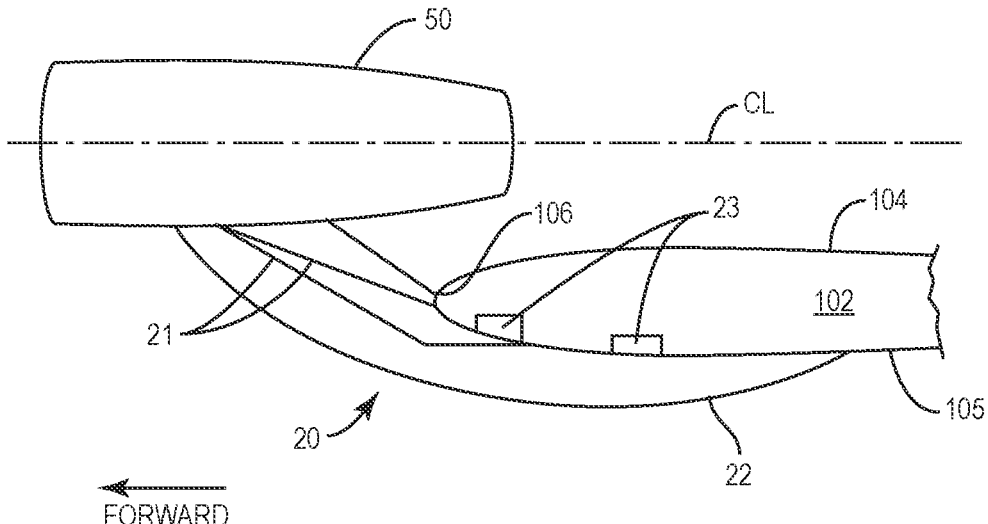
FIG. 2 is a schematic diagram of a strut that connects the engine to the wing and positions the engine over the wing.

FIG. 2 is a schematic diagram illustrating a strut 20 that mounts and positions the engine 50 on the wing 102. The strut 20 is mounted to the underside 105 of the wing 102. This positioning is away from the top side 104 such that the top side 104 remains free of any structures (e.g., fairings) that could cause a decrease in aircraft performance such as increased drag. The top side 104 of the wings 102 are clean as they remain free of structures that could cause a decrease in performance.

The overwing architecture positions the engine 50 relative to the wing 102 to vertically locate a centerline CL of the engine 50 above the wing 102. In some examples as illustrated in FIG. 2, the entirety of the engine 50 is vertically positioned above the wing 102. In other examples, the engine 50 partially vertically overlaps with the wing 102. The strut 20 is also configured to locate the engine 50 horizontally forward of the forward end 106 of the wing 102. In some examples, the entire engine 50 is positioned horizontally forward of the forward end 106 of the wing 102. In other examples as illustrated in FIG. 2, the engine 50 horizontally overlaps with the wing 102 with a first portion of the engine 50 positioned forward of the forward end 106 and a second portion horizontally overlaps with the wing 102.

The strut 20 includes structural members 21 that are load bearing structures to support and connect the engine 50 to the wing 102. The number and configuration of the structural members 21 can vary depending on the engine 50 and wing configurations. A mounting structure comprising one or more mounts 23 connects the strut 20 to the underside 105 of the wing 102. In some examples, the strut 20 also includes a fairing 22 that produces a smooth outline to reduce drag.

The overwing architecture maintains a conventional strut architecture that connects the engine 50 to the wing 102. The architecture includes discrete interfaces on a front spar of the wing 102 for reacting roll and yaw loads into the wing 102, and discrete link interfaces with the wing 102 which react pitch loads. The strut loft is contained to the wing lower surface and does not include overwing fairings. The design achieves a conventional strut architecture, and a clean upper wing skin surface which maintains aircraft performance. The design does not require special provisions for unique engine types but rather provides a common platform for a variety of different engine types. The design enables use of a conventional strut architecture for different engines 50 including but not limited to ducted high bypass fan engines, open rotor engines that include rotors 51, ducted engines, and open fan engines while keeping the airplane architecture static.

Figure 3:
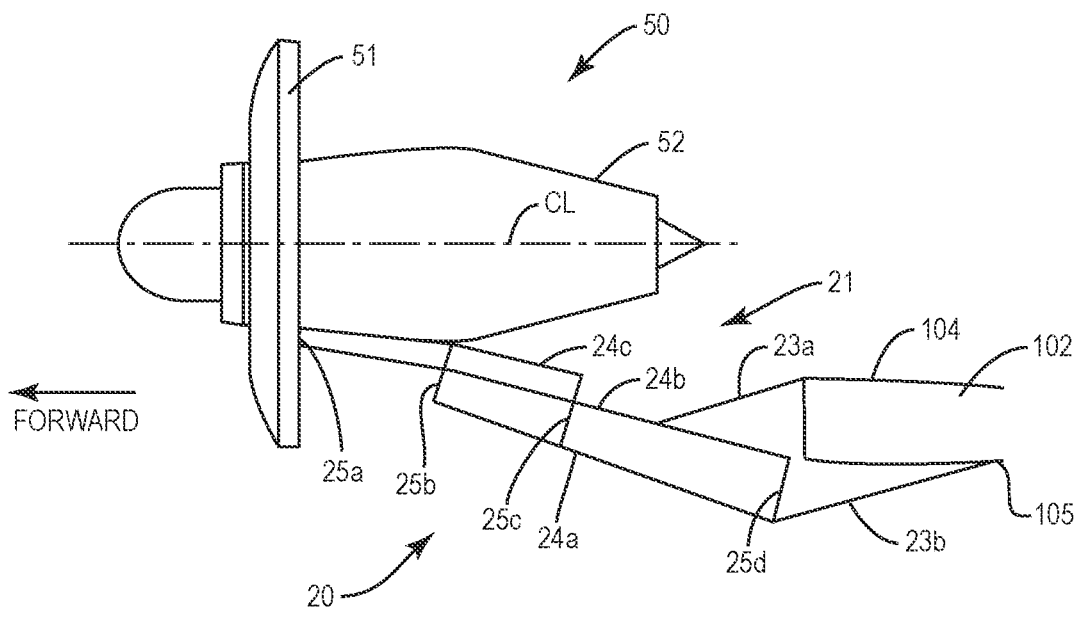
FIG. 3 is a schematic diagram of a first strut mounted to the underside of a wing and configured to position the engine over the wing.

FIG. 3 schematically illustrates a strut 20 that is mounted to the wing 102 at points that are away from the top side 104. The strut 20 is mounted with mounts 23a, 23b that include strut to wing links. The strut 20 includes three spars 24a, 24b, 24c that are spaced apart along the length and extend between the wing 102 and engine 50. Bulkheads 25a, 25b, 25c, 25d are spaced apart along the length and interconnect the spars 24. The engine 50 is mounted to the top of the strut 20 for an overwing architecture. The structural members 21 are configured in various manners to control the vertical height of the engine 50 relative to the wing 102.

In some examples as illustrated in FIG. 3, the engine 50 is mounted to the top of the strut 20. This positioning of the engine 50 relative to the strut 20 enables vertical space that positions the engine 50 above the wing 102. In other examples, the engine 50 is mounted to a lateral side or other section of the strut 20. This still provides for the overwing position of the engine 50 relative to the wing 102.

Figure 4:
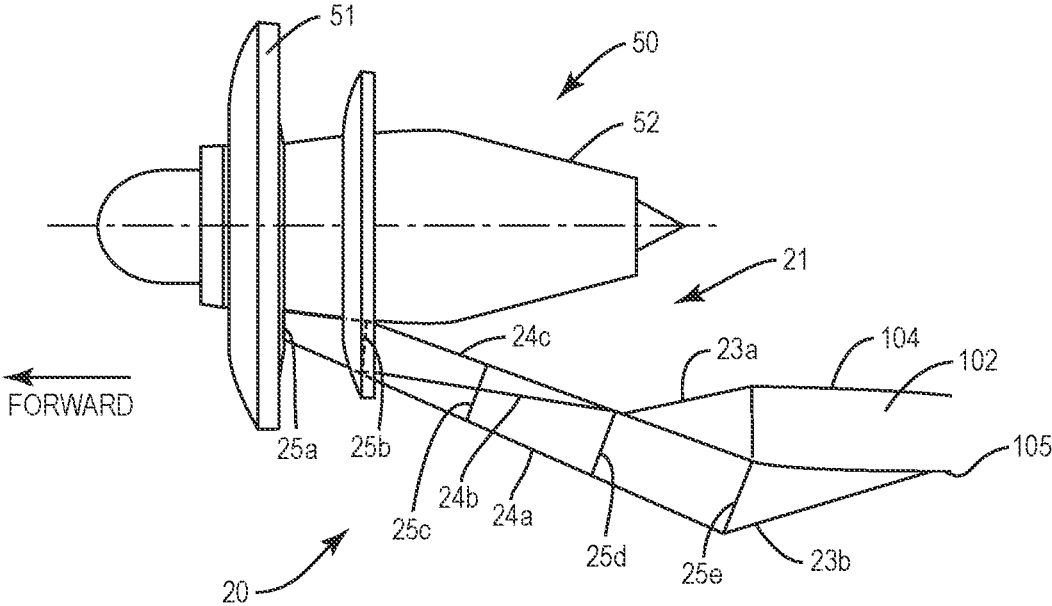
FIG. 4 is a schematic diagram of a second strut mounted to the underside of a wing and configured to position the engine over the wing.

FIG. 4 illustrates another strut 20 with a three spar configuration having spars 24a, 24b, 24c and bulkheads 25a-25e. The strut 20 of FIG. 4 enables the engine 50 to be positioned vertically farther above the wing 102 than the strut 20 of FIG. 3.

Figure 5:
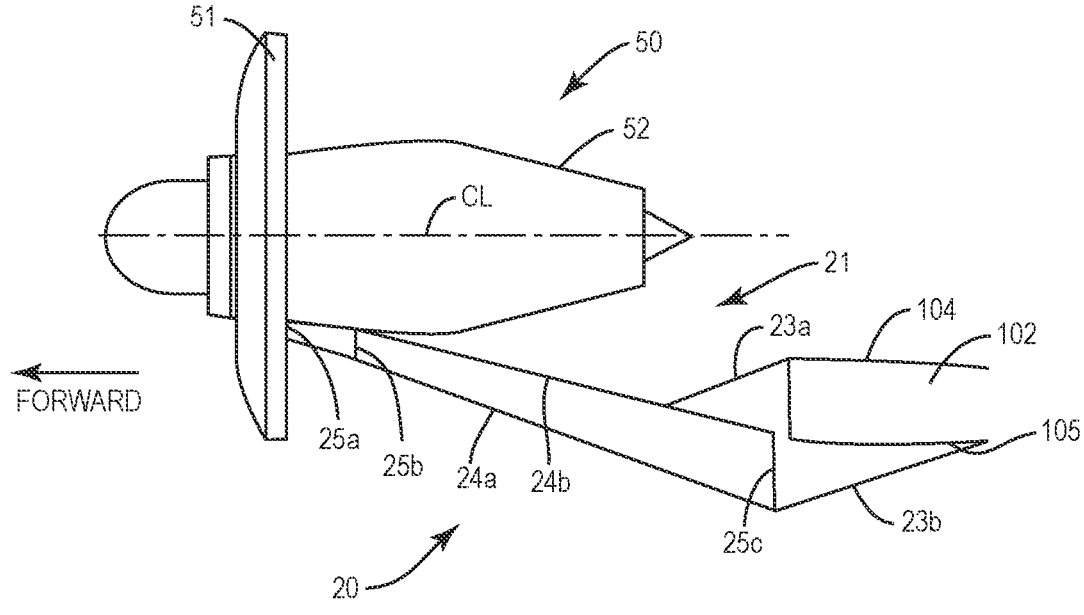
FIG. 5 is a schematic diagram of a third strut mounted to the underside of a wing and configured to position the engine over the wing.
Figure 6:
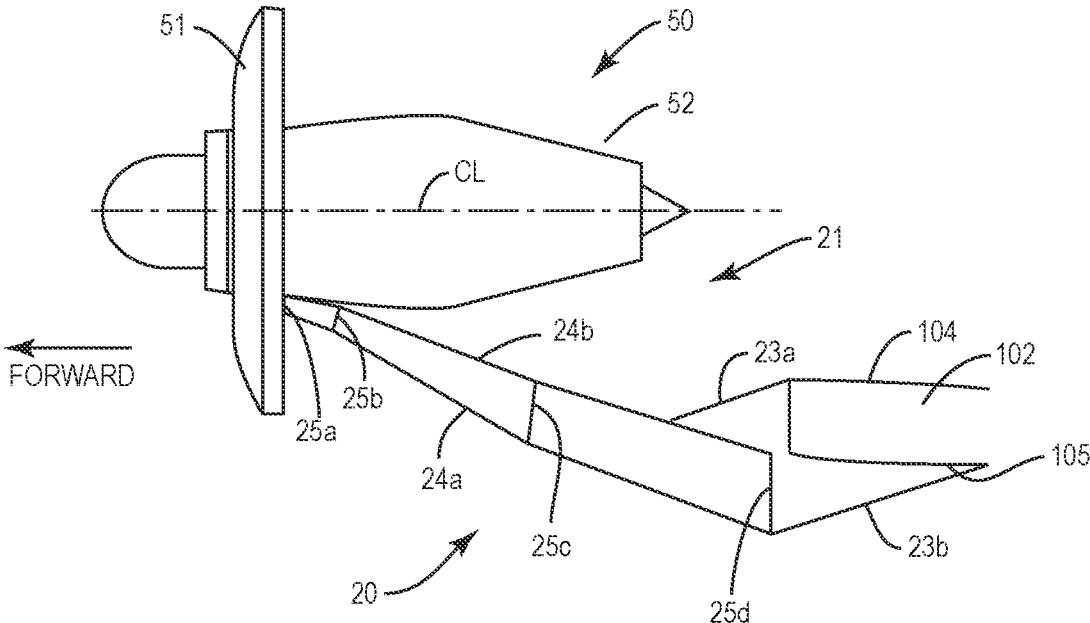
FIG. 6 is a schematic diagram of a fourth strut mounted to the underside of a wing and configured to position the engine over the wing.

FIG. 5 illustrates a strut 20 with a two spar configuration. Spars 24a, 24b are spaced apart along the length. Mounts 23a, 23b that include strut to wing links connect the strut 20 to the wing 102 at points away from the top side 104. FIG. 6 illustrates another two spar configuration with the struts being kinked to raise the vertical height of the engine 50 relative to the wing 102. The kinked spars 24a, 24b include a pair of substantially straight sections with an intermediate elbow. Bulkheads 25a-25d are spaced apart along the lengths of the spars 24a, 24b. In some examples, the kink design enables positioning the engine 50 vertically above the wing 102 a greater distance than non-kink designs.

Figure 7:
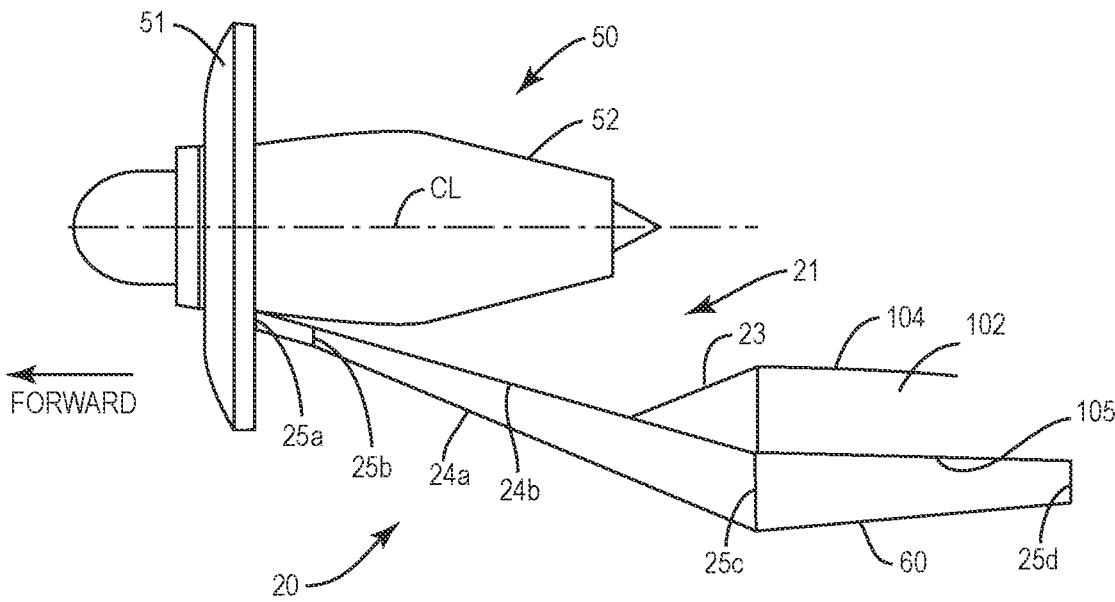
FIG. 7 is a schematic diagram of a fifth strut mounted to the underside of a wing and configured to position the engine over the wing.

FIG. 7 includes a strut 20 that includes an extended strut box 60 mounted to the underside 105 of the wing 102. One example includes a two spar design as shown in FIG. 7, although the strut 20 can include various configurations of spars 24 and bulkheads 25 and extend from a strut box 60.

In some examples as illustrated in FIG. 1, the overwing architecture is used with a low wing aircraft 100. In one specific example, the overwing architecture provides vertical space for an open rotor engine that include rotors 51 to be used with a low wing aircraft 100.

Figure 8:
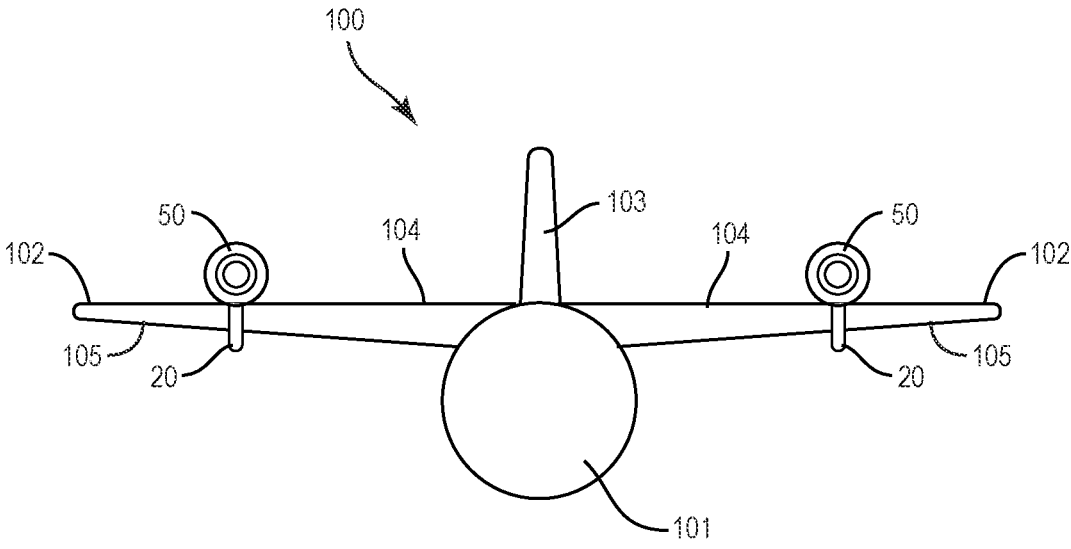
FIG. 8 is a schematic diagram of a front view of a high wing aircraft with an overwing architecture that positions the engines above the wings.

In other examples as schematically illustrated in FIG. 8, the overwing architecture is used with a high wing aircraft 100. A high wing aircraft 100 includes the wings 102 mounted above the fuselage 101. The design includes struts 20 that extend outward from the underside 105 of the wings 102. Engines 50 are mounted to the struts 20 and positioned vertically above the wings 102. The design provides for the top side 104 of the wings 102 to be free of any structures (i.e., clean) that could cause a decrease in aircraft performance.

The overwing architecture can be used with a number of different engines 50. Examples include but are not limited to ducted high bypass fan engines, open rotor engines that include rotors 51, ducted engines, and open fan engines. In some examples, the engines 50 provide transonic speeds that are within a range of Mach 0.6 to Mach 1.0. In one specific example, the aircraft 100 has a Mach number of substantially 1.0.

Figure 9:
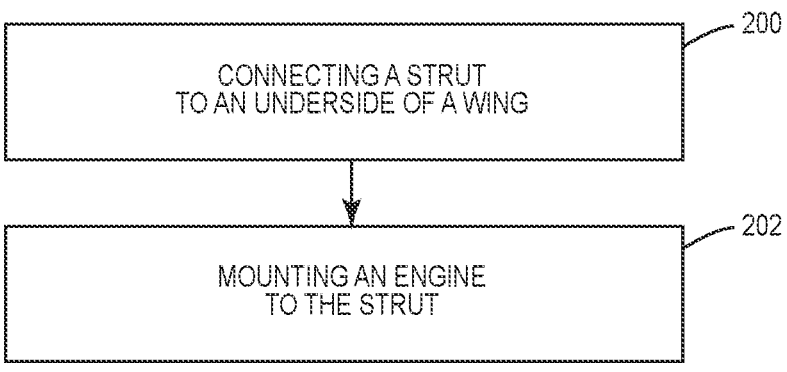
FIG. 9 is a flowchart diagram of a method of mounting an engine to an aircraft.

FIG. 9 illustrates a method of mounting an engine 50 to an aircraft 100. The method includes connecting a first end of a strut 20 to an underside of the wing (block 200). The strut 20 is positioned away from a top side 104 of the wing 102. The method also includes mounting the engine 50 to a second end of the strut 20 with a centerline of the engine 50 positioned vertically above the wing 102 (block 202). The order of the method can vary with some examples mounting the strut 20 to the wing 102 prior to mounting the engine 50. Other examples include attaching the engine 50 to the strut 20 prior to connecting the strut 20 to the wing 102.

The overwing architecture provides a variety of benefits. The overwing architecture enables the use of a conventional strut architecture. The overwing architecture does not require an overwing fairing that could increase drag and significantly reduce aircraft performance.

The overwing architecture enables significant variability in the position of the engine 50 relative to the wing 102. The overwing architecture supports multiple styles of engines 50 on the same aircraft 100 and is agnostic to engine type.

Another advantage of the overwing architecture is it positions the engines 50 above the wings 102 which improves the thermal environment. Hot exhaust gases move away from the wing 102 instead of being directed to the underside 105 of the wing 102. In some examples, the overwing architecture eliminates the need for a heat shield on the underside 105 of the wing 102. The overwing architecture also eliminates thermal exposure of the wing flap that is positioned on the trailing edge of the wing 102.

The overwing architecture improves safety. The engines 50 are positioned vertically higher relative to the ground thus lessening the chances of a person coming into contact with the engine. In some examples with engines having open rotors 51 or exposed blades, the increased vertical position lessens the chances of contact with the rotors/blades.

The overwing architecture also provides for increased fire safety. Fuel drains on the engine are positioned on the lower portion of the engine and below heat sources in the engine. There is less of a chance of a fire in the event the engines 50 break away from the wings 102 because fuel would move away from the heat sources.

In some examples with a ducted fan engine 50, the engine nacelle includes just a single bifurcation because the engines 50 are mounted to the top of the struts 20. This provides for better aerodynamics.

The overwing architecture improves the maximum lift on the wing. This provides for better weight aspects for take off and landing speed.

The overwing architecture enables improved reverse thrust efficiency. The overwing architecture has more area available for reversed fan flow for a ducted turbofan engine, less wear on the brakes, reduces landing field length requirements, and a more compact nacelle.

The overwing architecture can be used on aircraft 100 that provide various functions. The aircraft 100 is configured to transport cargo and/or passengers. In some examples, the aircraft 100 is a large commercial aircraft with the fuselage 101 including an upper cabin area configured to accommodate passengers and a lower cargo hold configured to store cargo. In other examples, the fuselage 101 is configured to store cargo.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An aircraft comprising:
a fuselage;
right and left wings coupled to the fuselage and with each of the wings comprising a top side;

struts that are connected to and that extend outward from an underside of the wings with the struts located forward of the wings such that the struts do not extend vertically over the top sides of the wings;
engines mounted to the struts; and
wherein the struts locate the engines in an overwing position.

2. The aircraft of claim 1, wherein the engines are mounted to tops of the struts.

3. The aircraft of claim 1, wherein a centerline of each of the engines is positioned vertically above the wings.

4. The aircraft of claim 1, wherein the top sides of the wings are clean by being free of structures that cause a decrease in performance.

5. The aircraft of claim 1, wherein the engines are open rotor engines.

6. The aircraft of claim 1, wherein the struts comprise:
spars that are spaced apart along a length of the struts;
bulkheads positioned along the length and aligned transverse to the spars; and
links that are connected to the wings.

7. The aircraft of claim 6, wherein each of the struts comprise at least two spars.

8. The aircraft of claim 1, wherein the aircraft comprises a low wing design with the wings positioned below the fuselage.

9. The aircraft of claim 1, wherein the aircraft is transonic.

10. An aircraft comprising:
a fuselage;
a right wing and a left wing each coupled to the fuselage, each of the right wing and the left wing comprising a top side and an underside;
a first strut mounted to the right wing away from the top side in a non-overlapping vertical orientation with the right wing;
a second strut mounted to the left wing away from the top side in a non-overlapping vertical orientation with the right wing;
a first engine mounted to the first strut and positioned vertically above the right wing; and
a second engine mounted to the second strut and positioned vertically above the left wing.

11. The aircraft of claim 10, wherein the aircraft is a low wing aircraft.

12. The aircraft of claim 10, wherein the aircraft is transonic.

13. The aircraft of claim 10, wherein the first engine vertically overlaps with the right wing and the second engine vertically overlaps with the left wing.

14. The aircraft of claim 10, wherein each of the first strut and the second strut include a common configuration of structural members.

15. The aircraft of claim 10, wherein each of the first engine and the second engine are open rotor engines.

16. The aircraft of claim 10, wherein each of the first strut and the second strut comprise kinks.

17. The aircraft of claim 10, wherein the first engine is positioned along the fuselage forward of a leading edge of the right wing and the second engine is positioned along the fuselage forward of a leading edge of the left wing.

18. A method of mounting an engine to a wing of a low wing aircraft, the method comprising:
connecting a first end of a strut to an underside of the wing with the strut positioned away from a top side of the wing; and
mounting the engine to a second end of the strut with a centerline of the engine positioned vertically above the wing and with the entire engine positioned forward of a leading edge of the wing.

19. The method of claim 18, further comprising mounting the engine to a top of the strut.

20. The method of claim 18, further comprising positioning a rotor of the engine forward of the leading edge of the wing.

* * * * *